United States Patent
Shimamoto et al.

(10) Patent No.: US 11,664,645 B2
(45) Date of Patent: May 30, 2023

(54) INTERNAL COMBUSTION ENGINE AND SPARK PLUG

(71) Applicant: DENSO CORPORATION, Kariya (JP)

(72) Inventors: Daisuke Shimamoto, Kariya (JP); Kaori Doi, Kariya (JP); Akimitsu Sugiura, Kariya (JP); Syuhei Nakashima, Kariya (JP); Kyosuke Fujita, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/528,902

(22) Filed: Nov. 17, 2021

(65) Prior Publication Data

US 2022/0077662 A1 Mar. 10, 2022

Related U.S. Application Data

(63) Continuation of application No. PCT/JP2020/018379, filed on May 1, 2020.

(30) Foreign Application Priority Data

May 20, 2019 (JP) .............................. JP2019-094238

(51) Int. Cl.
*H01T 13/54* (2006.01)
*H01T 13/32* (2006.01)
*F02B 19/12* (2006.01)
*F02P 13/00* (2006.01)

(52) U.S. Cl.
CPC .............. *H01T 13/32* (2013.01); *F02B 19/12* (2013.01); *F02P 13/00* (2013.01); *H01T 13/54* (2013.01)

(58) Field of Classification Search
CPC ................................ H01T 13/32; H01T 13/54
USPC ........................................................... 313/141
See application file for complete search history.

(56) References Cited

U.S. PATENT DOCUMENTS

| 4,416,228 | A | 11/1983 | Benedikt et al. |
| 4,914,343 | A | 4/1990 | Kagawa et al. |
| 11,418,013 | B1 * | 8/2022 | Yang ............. H01T 13/54 |
| 2005/0268882 | A1 † | 12/2005 | Robinet |
| 2006/0005803 | A1 | 1/2006 | Robinet et al. |
| 2007/0119409 | A1 † | 5/2007 | Johng |
| 2012/0125279 | A1 | 5/2012 | Hampson et al. |
| 2014/0102404 | A1 | 4/2014 | Sotiropoulou et al. |

(Continued)

FOREIGN PATENT DOCUMENTS

| JP | 2016-035854 | 3/2016 |
| JP | 2016-35854 | 3/2016 |
| WO | 2004/107518 | 12/2004 |

*Primary Examiner* — Christopher M Raabe
(74) *Attorney, Agent, or Firm* — Nixon & Vanderhye P.C.

(57) ABSTRACT

A spark plug includes a housing, a porcelain insulator, a center electrode, a ground electrode, and a prechamber-defining portion. The prechamber-defining portion has a prechamber formed therein. The prechamber-defining portion has a plurality of spray holes. At least one of the spray holes is an upstream spray hole which is arranged upstream of a plug center axis in a gas flow within a main combustion chamber and designed such that and an angle which an extension in an opening direction makes with an inner wall surface of the prechamber is selected to be larger than 90°. A spark gap is formed upstream of a plug center axis in the gas flow within the main combustion chamber.

4 Claims, 13 Drawing Sheets

(56) References Cited

U.S. PATENT DOCUMENTS

| | | |
|---|---|---|
| 2015/0361945 A1 | 12/2015 | Hampson et al. |
| 2016/0047295 A1 | 2/2016 | Sotiropoulou et al. |
| 2017/0358906 A1* | 12/2017 | Kuhnert ................. H01T 13/54 |
| 2018/0019577 A1* | 1/2018 | Gerstner ............... H01T 13/467 |
| 2018/0219356 A1 | 8/2018 | Jung |
| 2018/0294626 A1* | 10/2018 | Niessner ............. F02B 19/1004 |
| 2020/0006925 A1* | 1/2020 | Shigenaga .............. H01T 13/32 |
| 2020/0099198 A1* | 3/2020 | Kawata ................. H01T 13/32 |
| 2020/0358261 A1* | 11/2020 | Gozawa ................. H01T 13/54 |

\* cited by examiner
† cited by third party

INTERNAL COMBUSTION ENGINE AND SPARK PLUG

CROSS REFERENCE TO RELATED DOCUMENT

The present application is a U.S. continuation application of International Application No. PCT/JP2020/018379 filed on May 1, 2020 which designated the U.S. and claims the benefit of Japanese Patent Application No. 2019-94238 filed on May 20, 2019, the contents of each of which are incorporated herein by reference.

TECHNICAL FIELD

This disclosure generally relates to an internal combustion engine and a spark plug.

BACKGROUND ART

For instance, Patent literature 1 discloses an internal combustion engine having mounted therein a spark plug which is equipped with a prechamber surrounding a spark gap. The internal combustion engine works to ignite air-fuel mixture in the prechamber to generate flame. The flame occurring in the prechamber is jetted from spray holes communicating between the prechamber and a main combustion chamber, so that the flame propagates into the main combustion chamber to combust the air-fuel mixture. Patent literature teaches acceleration of growth of the flame using recirculation of gas flow within the prechamber.

PRIOR ART DOCUMENT

Patent Literature

Patent Literature 1
Japanese Patent First Publication No. 2016-53370

SUMMARY OF THE INVENTION

In the internal combustion engine described in Patent literature 1, the growth of the flame is considered, but however, ignition of mixture in the prechamber, that is, formation of an initial flame is not considered at all. In other words, Patent literature 1 does not refer to extension of a spark in the prechamber to improve the ignition of the mixture at all.

This disclosure is to provide an internal combustion engine and a spark plug which are excellent in ignitability thereof.

According to one aspect of this disclosure, there is provided an internal combustion engine equipped with a spark plug). The spark plug includes: (a) a cylindrical housing; (b) a porcelain insulator which is retained in the housing; (c) a center electrode which is retained in the porcelain insulator and protrudes from a top end of the porcelain insulator; (d) a ground electrode which is located outside the center electrode and faces an outer periphery of the center electrode to define a spark gap between itself and the center electrode; and (e) a prechamber-defining portion which is disposed on a top end of the housing. The prechamber-defining portion has formed therein a prechamber in which the spark gap is arranged. The prechamber-defining portion has a plurality of spray holes which communicate between the prechamber and a main combustion chamber of the internal combustion engine. At least one of the spray holes is an upstream spray hole which is arranged upstream of a plug center axis in a gas flow within the main combustion chamber and designed such that and an angle which an extension in the opening direction makes with an inner wall surface of the prechamber is selected to be larger than 90° on a base end side of the extension in the opening direction. The spark gap is arranged upstream of the plug center axis in the gas flow within the main combustion chamber.

According to another aspect of this disclosure, there is provided a spark plug for an internal combustion engine which comprises: (a) a cylindrical housing; (b) a porcelain insulator which is retained in the housing; (c) a center electrode which is retained in the porcelain insulator and protrudes from a top end of the porcelain insulator; (d) a ground electrode which is located outside the center electrode and faces an outer periphery of the center electrode to define a spark gap between itself and the center electrode; and (e) a prechamber-defining portion which is disposed on a top end of the housing. The prechamber-defining portion has formed therein a prechamber in which the spark gap is arranged. The prechamber-defining portion has a plurality of spray holes which communicate between the prechamber and an outside of the prechamber-defining portion. The center electrode has an electrode protrusion which protrudes outwardly radially and defines the spark gap between itself and the ground electrode which is arranged to face a protruding end of the electrode protrusion. At least one of the spray holes is a gap-side spray hole which is arranged at the same side of a plug center axis as the spark gap. The gap-side spray hole is designed such that an angle which an extension thereof in an opening direction makes with an inner wall surface of the prechamber is selected to be larger than 90° on a base end side of the extension in the opening direction.

In the internal combustion engine, the spark gap is located upstream of the plug center axis in the gas flow in the main combustion chamber. This causes the spark to be extended from the spark gap by a gas flow which is drawn from the main combustion chamber into the prechamber and then recirculated in the prechamber. This improves the ignition of an air-fuel mixture in the prechamber, which enhances ejection of flames from the spray holes into the main combustion chamber.

In the spark plug, the center electrode has the electrode protrusion which protrudes outwardly radially and defines the spark gap between itself and the ground electrode which is arranged to face the protruding end of the electrode protrusion. At least one of the spray holes is the gap-side spray hole. The improvement of the ignition of fuel is achieved by mounting the spark plug in the internal combustion engine with the gap-side spray hole being arranged upstream in a gas flow created in a main combustion chamber, thereby enhancing ejection of flames from the spray holes into the main combustion chamber.

As apparent from the above discussion, the above described modes provide an internal combustion engine and a spark plug which are excellent in ignitability of fuel.

BRIEF DESCRIPTION OF THE DRAWINGS

The above object, another object, features, or beneficial advantages in this disclosure will be more apparent from the following discussion with reference to the accompanying drawings.

MODES FOR CARRYING OUT THE INVENTION

First Embodiment

An embodiment of an internal combustion engine and a spark plug will be described below with reference to FIGS. 1 to 8.

Figure 1:
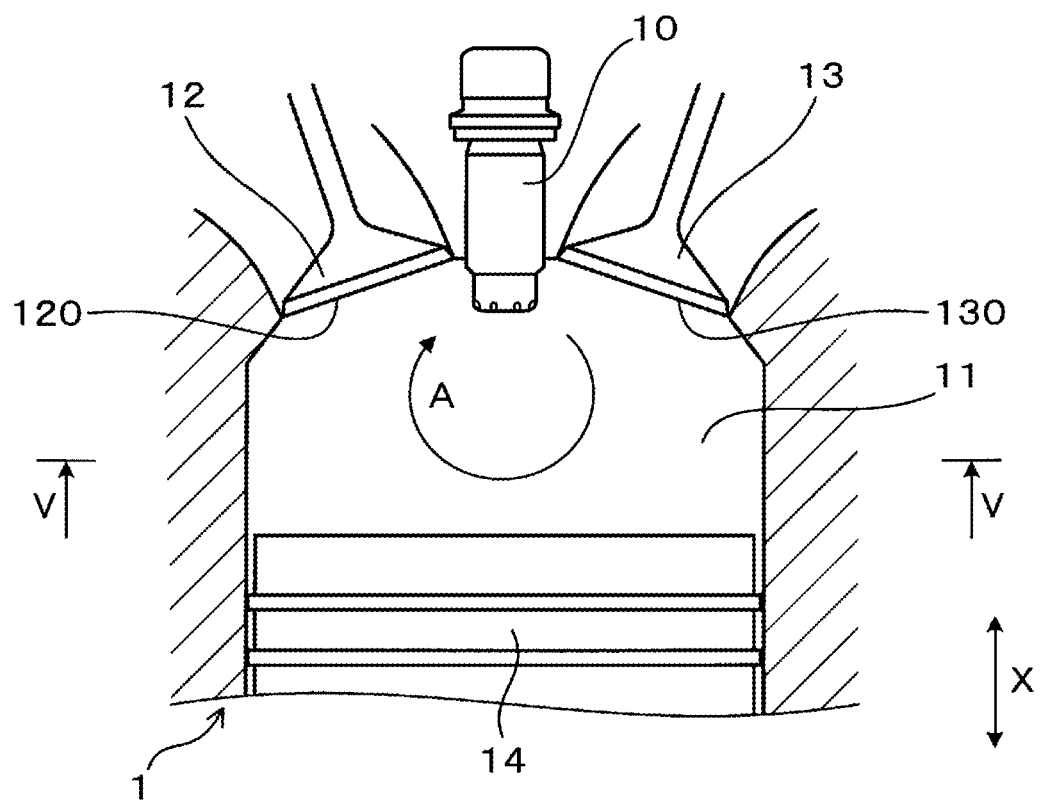
FIG. 1 is an explanatory sectional view of an internal combustion engine in the first embodiment.

The internal combustion engine 1 in this embodiment is, as clearly illustrated in FIG. 1, an internal combustion engine in which the spark plug 10 is mounted.

Figure 2:
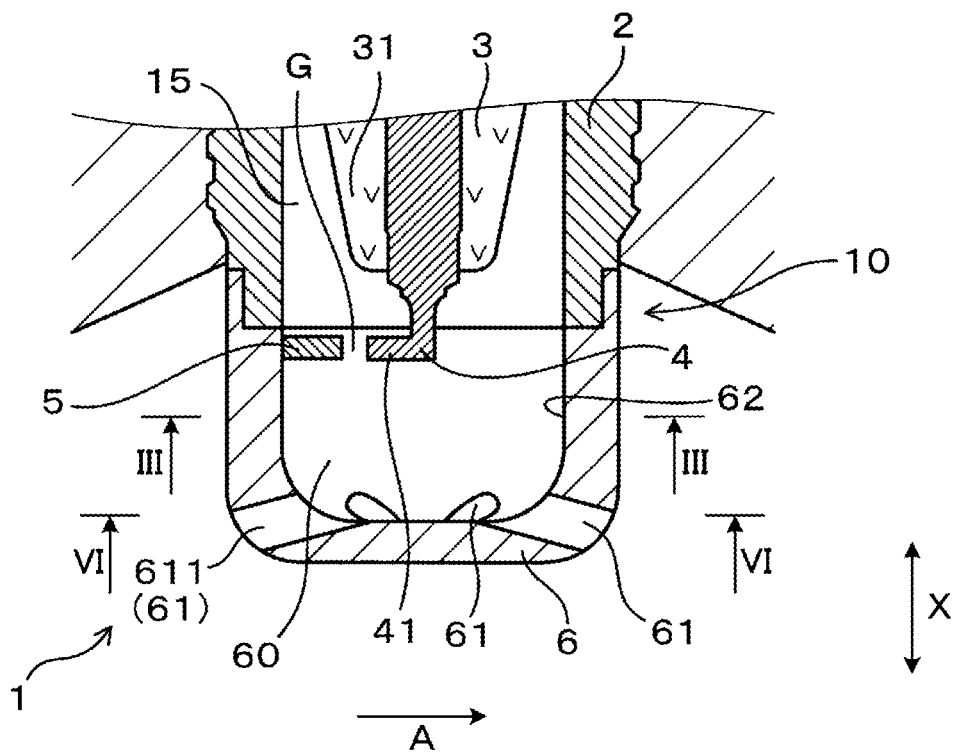
FIG. 2 is an explanatory sectional view of a top end portion of a spark plug in the first embodiment.
Figure 3:
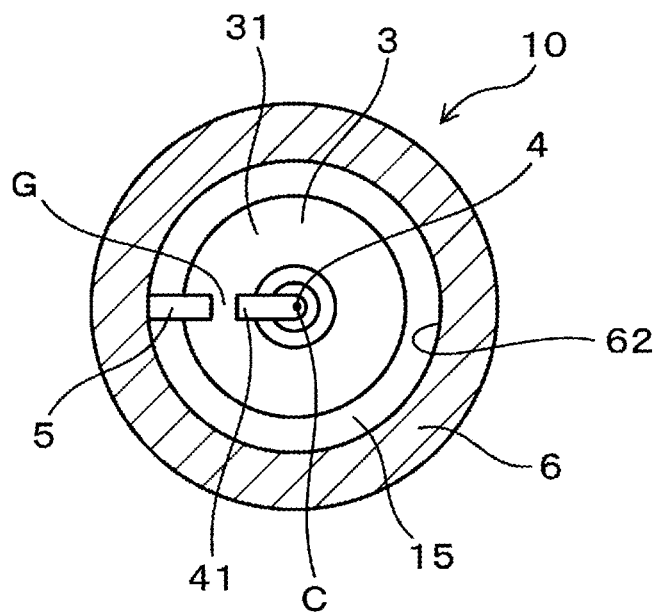
FIG. 3 is a sectional view taken along the ling III-III in FIG. 2.

The spark plug 10, as can be seen in FIGS. 2 and 3, includes the hollow cylindrical housing 2, the hollow cylindrical insulator 3, the center electrode 4, the ground electrode 5, and the prechamber-defining portion 6. The porcelain insulator 3 is retained inside the housing 2. The center electrode 4 is retained inside the porcelain insulator 3 and protrudes outside the top of the porcelain insulator 3. The ground electrode 5 is arranged to face an outer periphery of the center electrode 4 and define the spark gap G between itself and the center electrode 4. The prechamber-defining portion 6 is disposed on the head or top end of the housing 2.

The prechamber-defining portion 6 defines the prechamber 60 therein. The spark gap G is located inside the prechamber 60. The prechamber-defining portion 6 has formed therein a plurality of spray holes 61 which communicate between the prechamber 60 and the main combustion chamber 11 of the internal combustion engine 1. The spray holes 61 include at least one upstream spray hole 611 which is designed to meet the following conditions. Specifically, the upstream spray hole 611 is, as clearly illustrated in FIG. 4, formed more upstream than the plug center axis C is in a gas flow A within the main combustion chamber 11. The upstream spray hole 611 is oriented to have an angle a which the extension L1, as defined to extend in a direction in which the spray hole 611 opens, makes with the inner wall surface 62 of the prechamber 60 and is selected to be larger than 90° on a side of the extension L1 which is close to the base end of the spark plug 10.

The spark gap G is located upstream of the plug center axis C in the gas flow A within the main combustion chamber 11. In other words, the spark gap G is disposed on the left side of the plug center axis C, as viewed in FIG. 4. The prechamber 60 includes an inner space of a top end portion of the housing 2 around the center electrode 4. The inner wall surface 62 of the prechamber 60, therefore, includes an inner surface of the prechamber-defining portion 6 and an inner surface of a top end portion of the housing 2.

Figure 5:
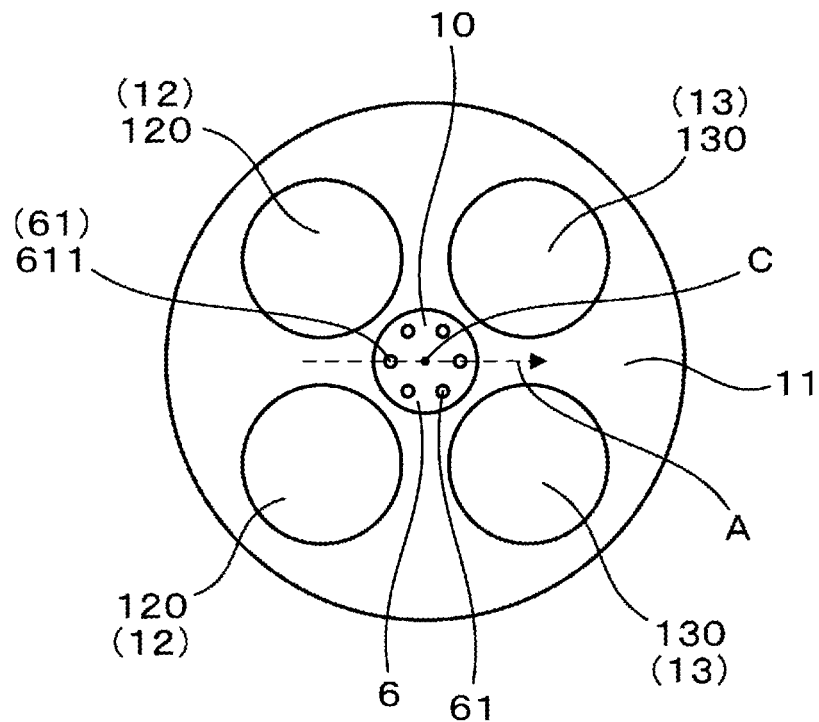
FIG. 5 is a sectional view taken along the line V-V in FIG. 1.

The internal combustion engine 1 is, as illustrated in FIGS. 1 and 5, equipped with the intake valves 12 which open or close the intake ports 120 and the exhaust valves 13 which open or close the exhaust ports 130. The spark plug 10 is mounted in an engine head and surrounded by the intake ports 120 and the exhaust ports 130. The two intake ports 120 and the two exhaust ports 130 are provided for the single main combustion chamber 11. Each of the intake valves 12 is disposed in a respective one of the intake ports 120 to selectively open or close it. Each of the exhaust valves 13 is disposed in a respective one of the exhaust ports 130 to selectively open or close it.

Figure 4:
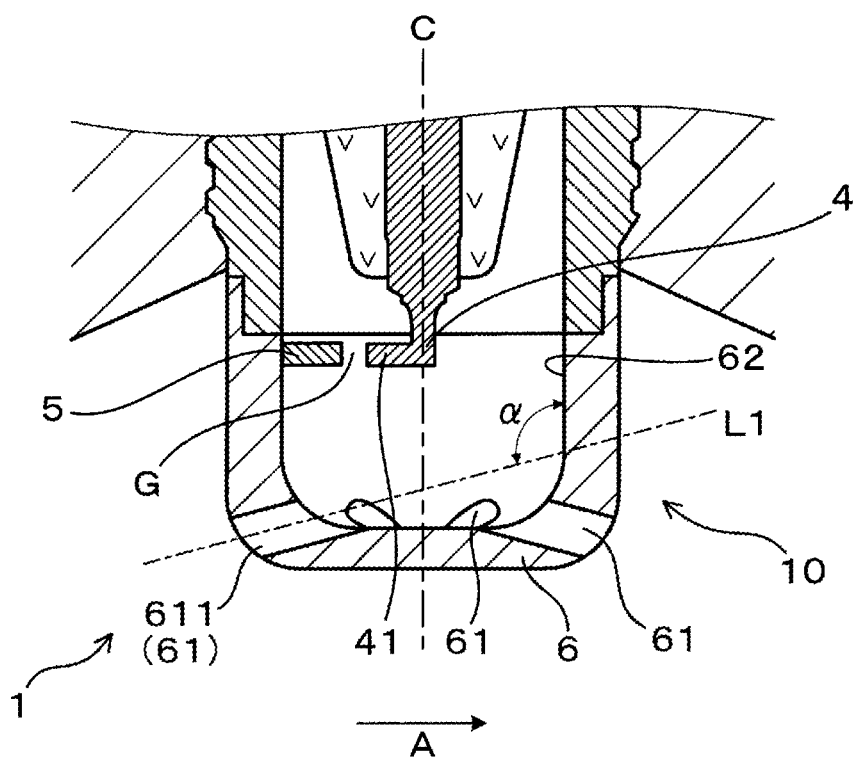
FIG. 4 is an explanatory sectional view which illustrates a top end portion of a spark plug in the first embodiment and in which an extension of a spray hole in an opening direction thereof is indicated.

The two intake ports 120 and the two exhaust ports 130 are arranged in a circle around the spark plug 10. The intake ports 120 are located adjacent each other around the spark plug 10. Similarly, the exhaust ports 130 are located adjacent each other around the spark plug 10. The intake ports 120 and the exhaust ports 130 are, as can be seen in FIG. 1, inclined obliquely relative to a direction in which the pistons 14 reciprocate so that the intake and exhaust ports 120 and 130 have directions in which they open (which will also be referred to as an opening direction) and which extend toward the center axis of the main combustion chamber 11. The main combustion chamber 11, as illustrated in FIG. 4, has a surface of the base end which is inclined to approach the top end with distance from the spark plug 10.

The spark plug 10, as can be seen in FIG. 1, has a head or top end which protrudes into the main combustion chamber 11. In other words, the prechamber-defining portion 6 is exposed to the main combustion chamber 11 so that the spray holes 61 are exposed inside the main combustion chamber 11. In this disclosure, a portion of the spark plug 10 which faces the main combustion chamber 11 will also be referred to as a top end or top end side in the plug axial direction X, while a portion of the spark plug 10 which is located far away from to the top end will also be referred to as a base end or base end side in the plug axial direction X. A cylinder which defines the main combustion chamber 11 and has the piston 14 disposed therein.

The internal combustion engine 1 is designed to cyclically perform intake, compression, expansion (i.e., combustion), and exhaust strokes of the piston 14 while reciprocating. During the intake stroke, gas is drawn the intake ports 120 into the main combustion chamber 11 and then emitted from the main combustion chamber 11 through the exhaust ports 130 in the exhaust stroke.

Within the main combustion chamber 11, a tumble flow usually occurs, as indicated by an arrow A in FIG. 1, which is a gas flow around an axis extending perpendicular to a direction in which the piston 14 reciprocates. This type of gas flow is oriented from the intake valves 12 to the exhaust valves 13 around the top end of the spark plug 10 within the main combustion chamber 11. More specifically, as viewed in the plug axial direction X in FIG. 5, a flow of gas which moves in a direction A from the center between the two intake ports 120 to the center between the two exhaust ports 130 will be main gas flow near the top end of the spark plug 10.

The gas flow within the main combustion chamber 11 is not always constant in direction thereof, but usually varies between cycles or in each cycle of the internal combustion engine 1. Particularly, the direction of the main gas flow substantially remains unchanged at the ignition timing. The above described gas flow refers to the main gas flow at the ignition timing. In this disclosure, the gas flow within the main combustion chamber 1 or main chamber gas flow refers to a gas flow near the top end of the spark plug 10 at the ignition timing unless otherwise specified. A term an upstream side or a downstream side use in this disclosure will refer to an upstream side or a downstream side of the gas flow within the main combustion chamber 11, i.e., the main chamber gas flow unless otherwise specified.

The following discussion will refer to the single spark plug 10 itself. The prechamber-defining portion 6 of the spark plug 10 has formed therein a plurality of spray holes 61. Each of the spray holes 61 communicates between the prechamber 60 and the outside of the prechamber-defining portion 6. The center electrode 4 is equipped with the electrode protrusion 41 which extends radially outward. The electrode protrusion 41 has a protruding end (i.e., a tip) which defines the spark gap G between itself and the ground electrode 5 which faces the protruding end of the electrode protrusion 41.

At least one of the spray holes 61 which is located at the same side of the plug center axis C as the spark gap G includes the spray hole 611. In other words, as viewed in the plug axial direction X, an angle which a vector extending from the plug center axis C to the gap-side spray holes 611 makes with a vector extending from the plug center axis C to the spark gap G is selected to be less than 90°. In this embodiment, the above described upstream spray hole 611 is provided at least by the gap-side spray hole 611.

The gap-side spray hole 611 is, as illustrated in FIG. 4, arranged to have the angle a which the extension L1 in the opening direction makes with the inner wall surface 62 of the prechamber 60 and exceeds 90° at the base end side of the extension L1 in the opening direction.

The thus configured spark plug 10 is mounted in the engine head in a given orientation to complete the internal combustion engine 1 in this embodiment. Specifically, the spark plug 10 is installed in the engine head to have the spark gap G located upstream of the plug center axis C in the main chamber gas flow A, thereby producing the internal combustion engine 1 in this embodiment.

In the internal combustion engine 1 in which the spark plug 10 is mounted, the spark gap G is located upstream of the plug center axis C. The center electrode 4, as clearly illustrated in FIG. 3, has formed on the top end thereof the electrode protrusion 41 extending on the upstream side. In this embodiment, the ground electrode 5 protrudes inwardly from the inner wall surface 62 of the prechamber 60. The ground electrode 5 is disposed on the prechamber-defining portion 6. In other words, the ground electrode 5 protrudes from the inner wall surface 62 of the prechamber-defining portion 6 toward the center electrode 4. The ground electrode 5 and the electrode protrusion 41 of the center electrode 4 face each other in a plug radial direction. The spark gap G is created between the protruding end of the ground electrode 5 and the electrode protrusion 41 of the center electrode 4. The plug radial direction, as referred to herein, represents a direction perpendicular to the plug center axis C.

Figure 6:
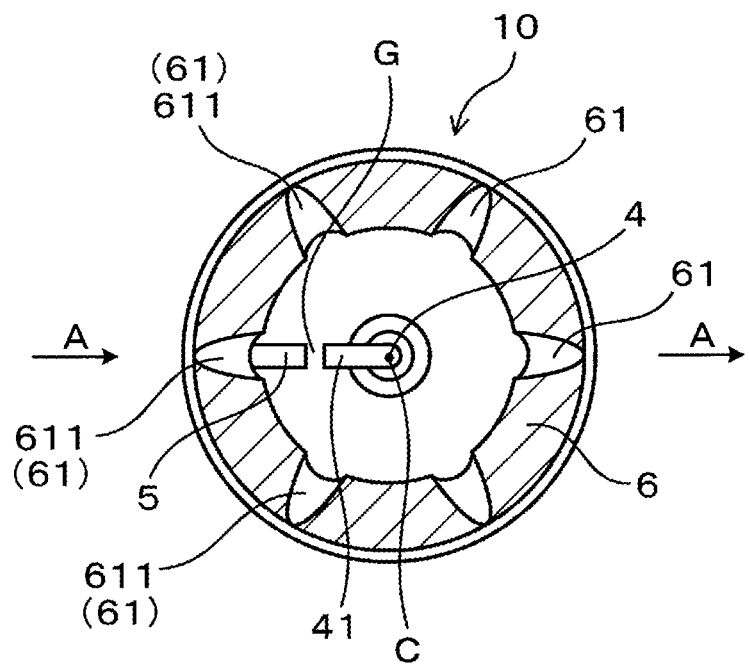
FIG. 6 is a sectional view taken along the line VI-VI in FIG. 2.

The prechamber-defining portion 6 of the spark plug 10, as can be seen in FIGS. 5 and 6, has a plurality of spray holes 61 formed therein. A half of the spray holes 61 are used as the upstream spray holes 611. Particularly, in this embodiment, the prechamber-defining portion 6 has formed therein the six spray holes 61 which are arranged at equal intervals away from each other in the circumferential direction of the prechamber-defining portion 6. Three of the spray holes 61 are used as the upstream spray holes 611 which are arranged upstream of the plug center axis C in the main chamber gas flow A. The remaining three spray holes 61 are located downstream of the plug center axis C.

One of the three upstream spray holes 611 is, as viewed in the plug axial direction X, located on a line extending from the plug center axis C to the middle point between the intake ports 120. In other words, as viewed in the plug axial direction X, a line passing through the upstream spray hole 611 and the plug center axis C extends substantially parallel to the gas flow A. In the intake stroke, the largest amount of gas is drawn from the upstream spray hole 611 into the main combustion chamber 11.

The spray holes 61 are, as clearly illustrated in FIG. 4, inclined toward the base end side in a direction from outside to inside them. An extension of the center axis of each of the spray holes 61, i.e., the extension L1 intersects with an opposite portion of the inner wall surface 62 of the prechamber 60. In other words, the extension L1 extending from the center axis of the upstream spray hole 611 intersects with a downstream portion of the inner wall surface 62 of the prechamber 60. One of angles which the extension L1 makes with the inner wall surface 62 at the above intersection and is close to the base end side is the angle a which is greater than 90°, in other words, an obtuse angle.

In a case where the inner wall surface 62 is inclined outward in a direction to the base end side, the upstream spray hole 611 may be oriented to extend perpendicular to the plug axial direction X as along as the above angle a is selected to be an obtuse angle.

In this embodiment, the inner wall surface 62 is formed to extend parallel to the plug axial direction X. The spray holes 61 are, as described above, oblique so as to approach the base end side in the direction from outside to inside the spray holes 61. This creates an obtuse angle which the extension L1 makes with the inner wall surface 62 on the base end side.

Figure 7:
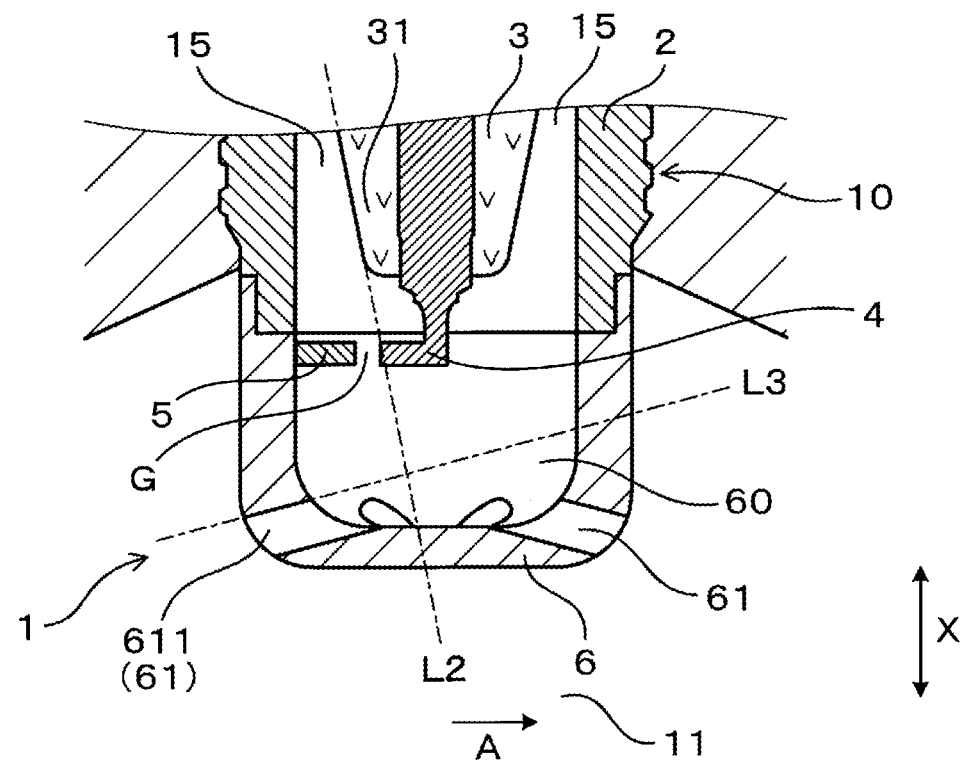
FIG. 7 is an explanatory sectional view which illustrates a top end portion of a spark plug in the first embodiment and in which an extension of a base end side surface of a spray hole and an extension of a tapered head are indicated.

The porcelain insulator 3, as clearly illustrated in FIG. 7, includes the tapered head 31 which has a diameter decreasing toward the tip thereof. In a planar cross section illustrated in FIG. 7 which includes the plug center axis C and passes through the spark gap G, the spark gap G is located upstream of the extension L2 of an outer peripheral surface of the tapered head 31 in the gas flow A within the main combustion chamber 11.

In order to achieve the above arrangements, the spark plug 10 is configured in the following way. Specifically, in the planar cross section of the spark plug 10 which includes the plug center axis C and passes through the spark gap G, the spark gap G is arranged farther away from the plug center axis C than the extension L2 of the outer peripheral surface of the tapered head 31 is.

The prechamber-defining portion 6 is, as illustrated in FIGS. 2 and 3, arranged to surround the top end portion of the cylindrical housing 2. The pocket 15 that is an annular void space is created between the housing 2 and the tapered head 31 of the porcelain insulator 3. In other words, the porcelain insulator 3 is, although not illustrated, secured or joined at a portion of the outer peripheral surface thereof to the inner peripheral surface of the housing 2. A portion of the porcelain insulator 3 which is located closer to the tip thereof than the joint of the porcelain insulator 3 to the housing 2 is forms the tapered head 31. The annular pocket 15 is located between the outer periphery of the tapered head 31 and the inner periphery of the housing 2. The prechamber 60 that is an inner space of the prechamber-defining portion 6 communicates with the pocket 15.

The spark gap G is, as illustrated in FIG. 7, located closer to the base end side than the extension L3 of a base end side surface of the upstream spray hole 611 is. The extension L3 of the base end side surface of the upstream spray hole 611 is a line which is defined to extend along the center axis of each of the upstream spray holes 611 in contact with a portion of the upstream spray hole 611 which is closest to the base end side. In this embodiment, the ground electrode 5 protrudes from a portion of the prechamber-defining portion 6 which is located closer to the base end side than the spray holes 61 are in the plug axial direction.

In the internal combustion engine 1 configured in the above way, gas in the main combustion chamber 11 is drawn into the prechamber 60 through the spray holes 61 and then emitted from the prechamber 60 into the main combustion chamber 11 through the spray holes 61. The gas flow A, as demonstrated in FIG. 1, exists in the form of a tumble flow within the main combustion chamber 11, thereby facilitating the introduction of gas from the main combustion chamber 11 into the prechamber 60 through the upstream spray hole 611.

Figure 8:
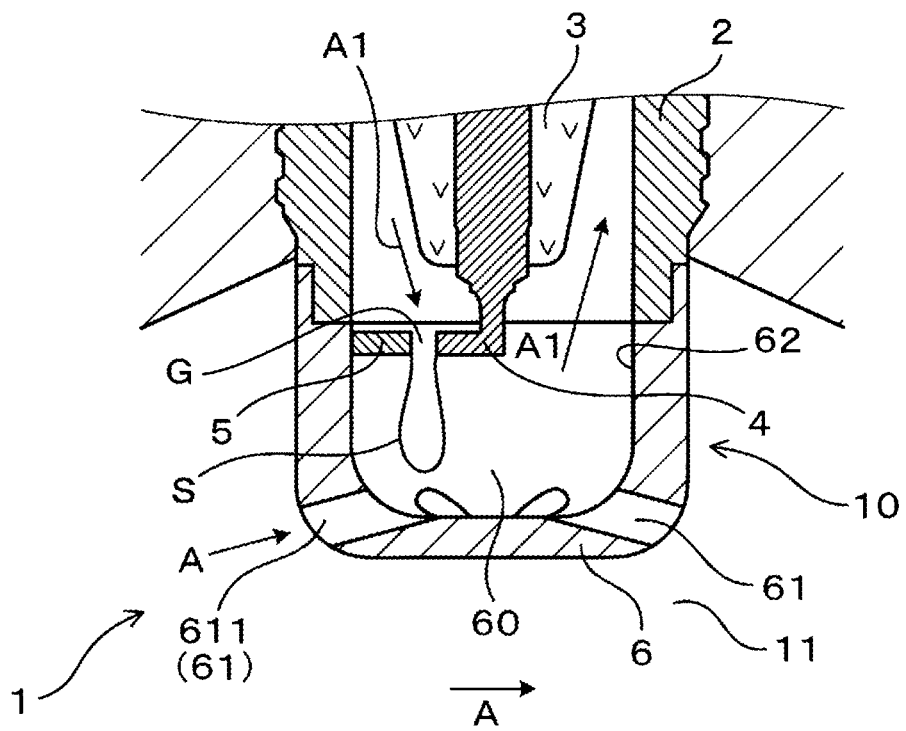
FIG. 8 is an explanatory sectional view which illustrates a top end portion of a spark plug and which explains beneficial effects offered by extension of a spark in the first embodiment.

A main flow of the gas drawn into the prechamber 60 is, as indicated by an arrow A1 in FIG. 8, directed to a downstream portion of the inner wall surface 62 of the prechamber 60, travels toward the base end side along the inner wall surface 62, and then enters the downstream side of the pocket 15. The main flow of gas entering the downstream side in the pocket 15 is turned in direction to the upstream side in the pocket 15 and then moved along an upstream portion of the pocket 15 toward the top end of the pocket 15. The main flow of the gas then enters the prechamber 60 again and is emitted from some of the spray holes 61 which are arranged on the downstream side. The flow of gas described above (i.e., the gas flow A1) is a main gas flow. All of the gas does not always flow in the above way.

The gas flow A1 is produced in the prechamber 60 in the above way, so that it is directed toward the top end side in the spark gap G located upstream of the plug center axis C. This causes an electric spark S developed in the spark gap G to be, as illustrated in FIG. 8, extended to the top end side.

The operation and beneficial advantages of this embodiment will be described below. In the internal combustion engine 1, the spark gap G is located upstream of the plug center axis C in the main chamber gas flow A. This causes the spark S to be, as described above, extended from the spark gap G to the top end side of the spark plug 10 by the gas flow A1 which is drawn from the main combustion chamber 11 into the prechamber 60 and then recirculated in the prechamber 60 (see FIG. 8). This improves the ignition of an air-fuel mixture in the prechamber 60, which enhances ejection of flames from the spray holes 61 into the main combustion chamber 11.

In a planar cross section of the spark plug 10 which includes the plug center axis C and passes through the spark gap G, the spark gap G is located upstream of the extension L2 extending from the outer peripheral surface of the tapered head 31 in the main chamber gas flow A. This ensures the stability in extending the spark S to the top end side. Specifically, the gas flow A1 moving from the pocket 15 into the prechamber 60 is usually enhanced in a region located farther away from the plug center axis C than the extension L2 is. The extension of the spark S is, therefore, effectively achieved by forming the spark gap G to be located closer to the outer periphery of the spark plug 10 (i.e., an upstream side of the main chamber gas flow A) than the extension L2 is.

The spark gap G is located closer to the base end side than the extension L3 extending from the base end side surface of the upstream spray hole 611, thereby minimizing disturbance of the gas flow A1 near the spark gap G. Specifically, the gas flow A1 immediately after being drawn from the upstream spray hole 611 into the prechamber 60 traverses the plug center axis and is directed to the base end side. if such a gas flow reaches near the spark gap G, it may result in disturbance of the gas flow A1 directed to the top end side. In order to alleviate this drawback, the spark gap G is arranged closer to the base end side than the extension L3 is, thereby ensuring the stability in creating the gas flow A1 directed to the top end side within the spark gap G and facilitating the ease with which the spark S is extended.

The ground electrode 5 protrudes inwardly from the inner wall surface 62 of the prechamber 60, thereby minimizing a variation in location of an electrical spark to ensure the stability in extending the spark S using the gas flow A1 within the prechamber 60.

As apparent from the above discussion this embodiment provides a spark plug for internal combustion engines which is excellent in ignition of fuel.

First Comparative Mode

Figure 9:
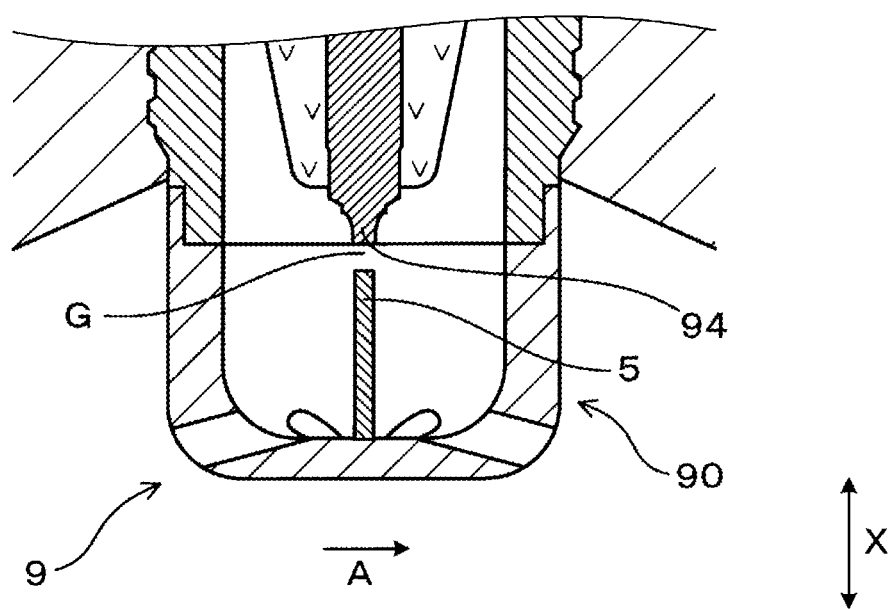
FIG. 9 is an explanatory sectional view of a top end portion of a spark plug in a comparative mode.

This comparative mode is a mode, as illustrated in FIG. 9, in which the spark gap G in the spark plug 90 is located on the plug center axis C. Specifically, the ground electrode 95 is designed to protrude from the inner surface of the top end portion of the prechamber-defining portion 6 to the base end side along the plug center axis C. The ground electrode 95 and the center electrode 94 face each other in the plug axial direction X to define the spark gap G therebetween. Other arrangements are identical with those in the first embodiment.

First Experimental Example

Figure 10:
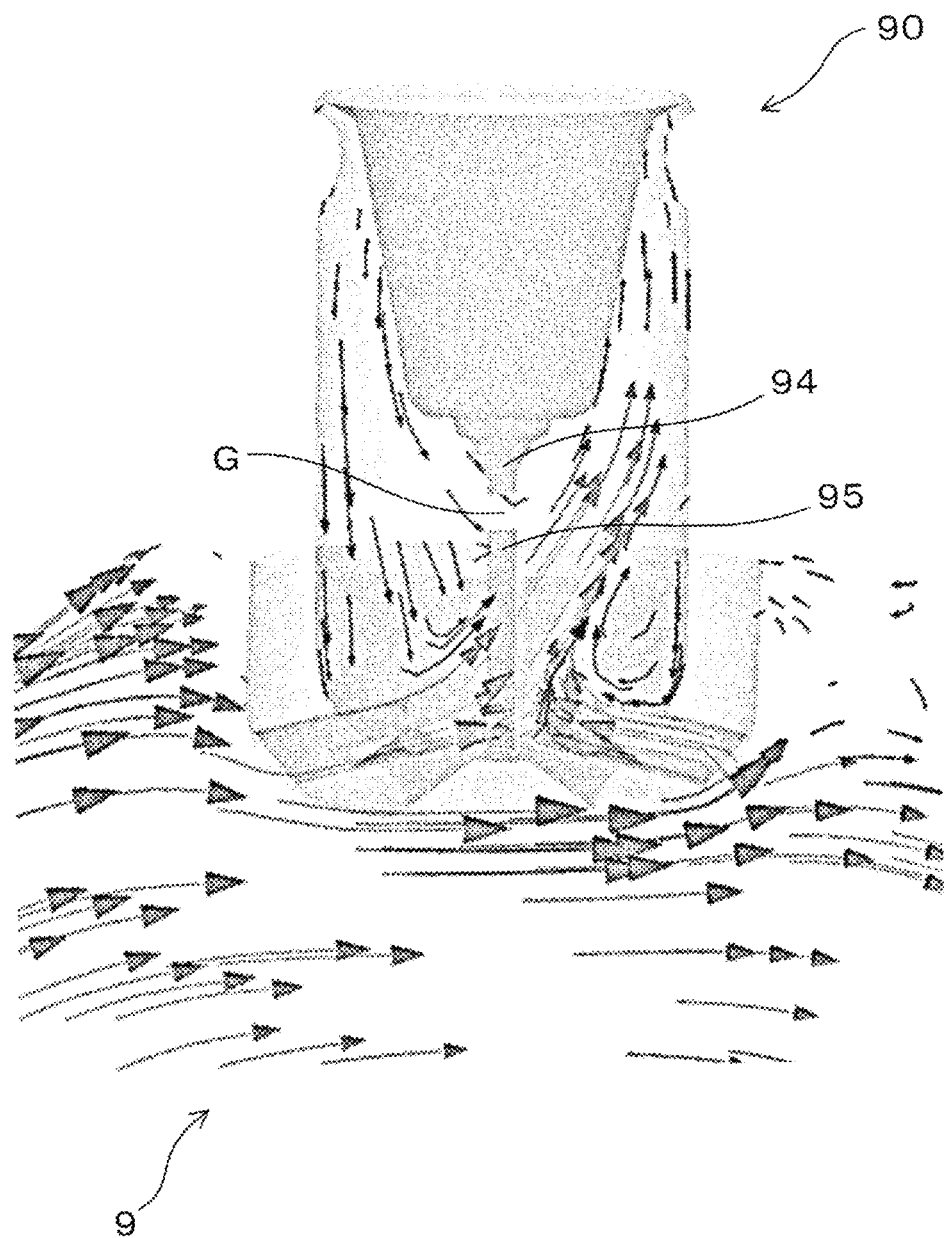
FIG. 10 is a view of analysis of a gas flow in an internal combustion engine in a comparative mode using CFD in the first experimental example.
Figure 11:
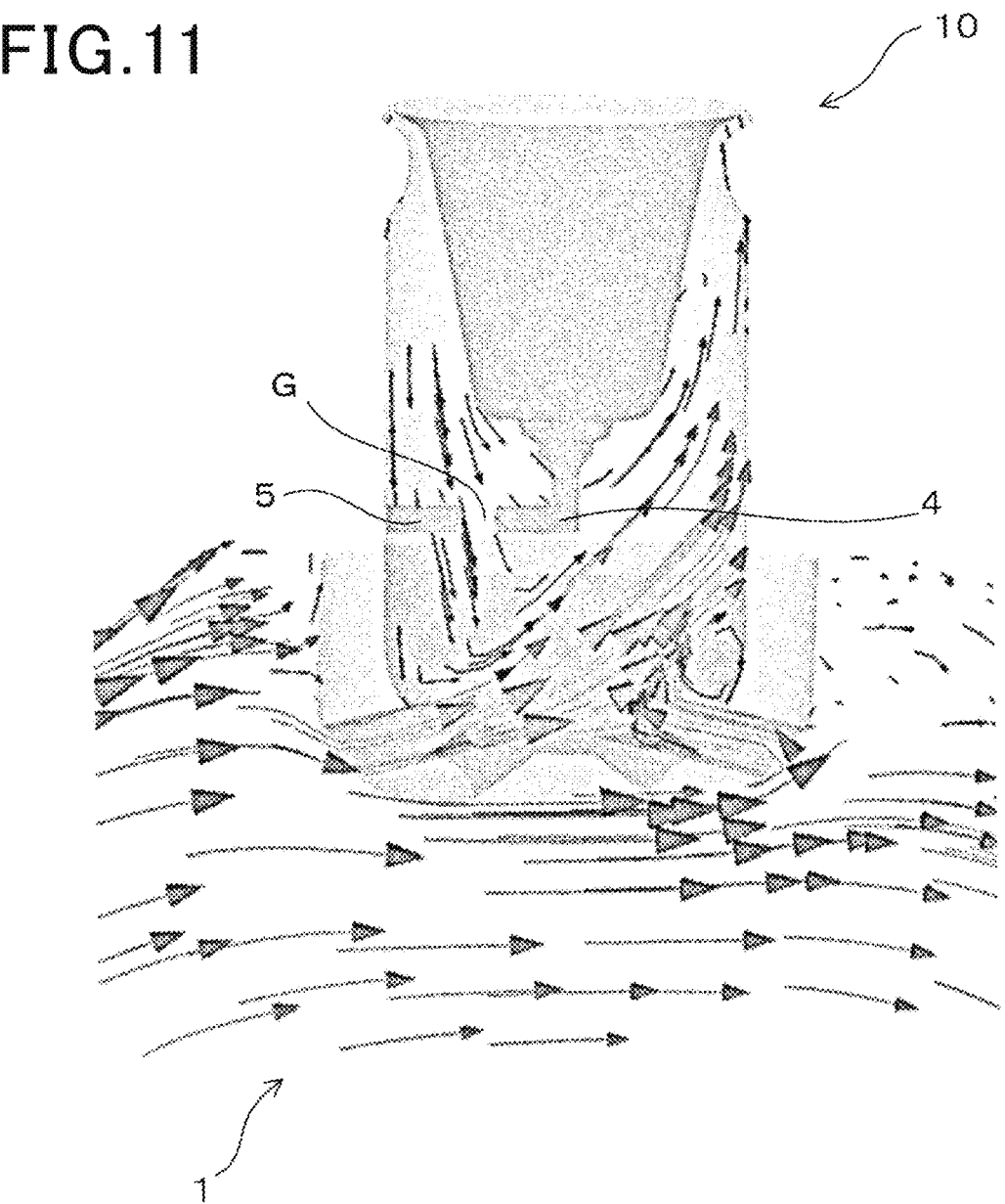
FIG. 11 is a view of analysis of a gas flow in an internal combustion engine in a comparative mode using CFD in the first embodiment.

This example, as demonstrated in FIGS. 10 and 11, analyzes gas flows within the prechamber 60 of each of the internal combustion engine 1 in the first embodiment and the internal combustion engine 9 in the first comparative mode. The analysis of the gas flows was made using computational fluid dynamics (which will be referred to as CFD). Specifically, a typical simulation analysis was made using CFD on gas flows usually generated in a case where each of the internal combustion engine 1 in the first embodiment and the internal combustion engine 9 in the first comparative example is used as an automotive engine.

Results of the analysis on the first comparative mode are shown in FIG. 10. Results of the analysis on the first embodiment are shown in FIG. 11. In FIGS. 10 and 11, each arrow represents a direction of a gas flow. The larger size of the triangular head of each arrow indicates a higher velocity of the gas flow.

The gas flows drawn from the upstream spray holes 611 into the prechamber 60 are, as can be seen in FIGS. 10 and 11, directed to the downstream side in the pocket 15 and then travel from the upstream side in the pocket 15 toward the top end side of the prechamber 60. In the internal combustion engine 9 in the first comparative mode, the gas flows traversing the spark gas G are, as can be seen from FIG. 10, weak, and directions thereof are random. In contrast, in the internal combustion engine 1 in the first embodiment illustrated in FIG. 11, the gas flows whose velocities are relatively high and which are oriented substantially the same direction traverse the spark gap G. The results of the analysis are substantially identical with those on the gas flow A1 (see FIG. 8) described above in the first embodiment. The gas flows in FIG. 11 are thought of as extending the spark G to the top end side of the spark plug 10.

Second Experimental Example

Figure 12:
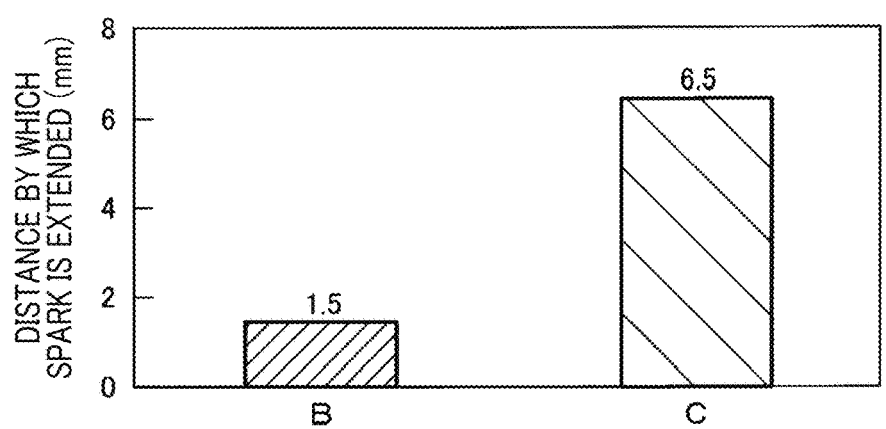
FIG. 12 is a diagrammatic view which represents results of measurements of distances by which sparks are extended in the second experimental example.

This example is, as illustrated in FIG. 12, to analyze advantageous effects offered by extension of a spark in each of the internal combustion engine 1 in the first embodiment and the internal combustion engine 9 in the first comparative mode. Tests were performed using a two-liter four-cylinder engine in conditions where the speed of the engine is 1,200 rpm, a load on the engine is 150 kPa, and an air-fuel ratio is 14.7:1. The size of the spark gap G is 0.7 mm. The diameter of the spray holes is 1.2 mm. The volume of the prechamber is 1 ml.

Figure 13:
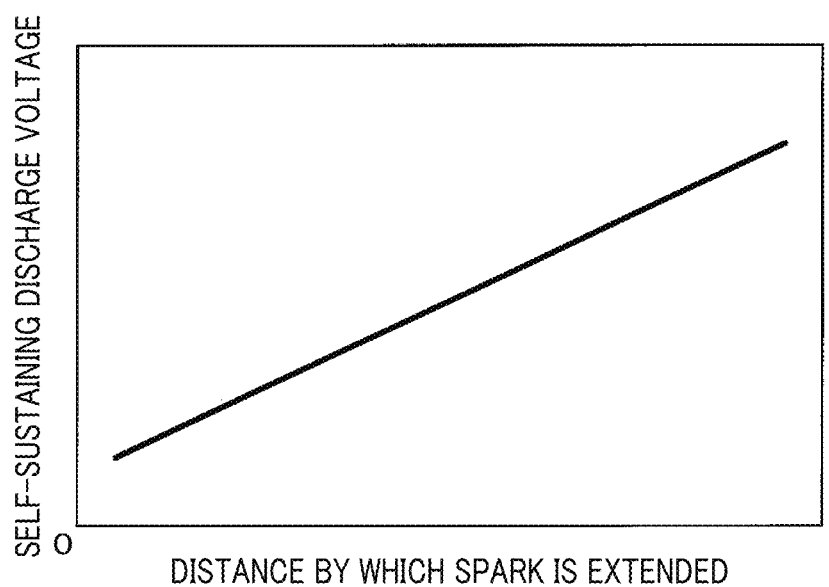
FIG. 13 is a diagrammatic view which represents a relation between a distance by which a spark is extended and a self-sustaining discharge voltage in the second experimental example.

We applied voltage to the spark plug to create electrical discharges or sparks in the spark gap G in the above conditions and measured waveforms of the sparks to derive a self-sustaining discharge voltage which is shown in a graph of FIG. 13. It is known that the higher the self-sustaining discharge voltage, the longer the distance by which the spark is extended. We used the self-sustaining discharge voltage to calculate the distance by which the spark was extended by look up using a predetermined relation between self-sustaining discharge voltages and distances by which the spark is extended. The distance by which the spark is extended, as referred to herein, is a distance between ends of a discharge path through which the spark passes (which will also be referred to below as spark-extended distance).

FIG. 12 represents results of the above measurements. In FIG. 12, "B" indicates the first comparative mode. "C" indicates the first embodiment. The graph in FIG. 12 shows that the spark-extended distance in the internal combustion engine 1 in the first embodiment is greatly larger than that in the internal combustion engine 9 in the first comparative mode. It is, thus, found that the first embodiment offers great benefits from the extension of sparks.

Third Experimental Example

Figure 14:
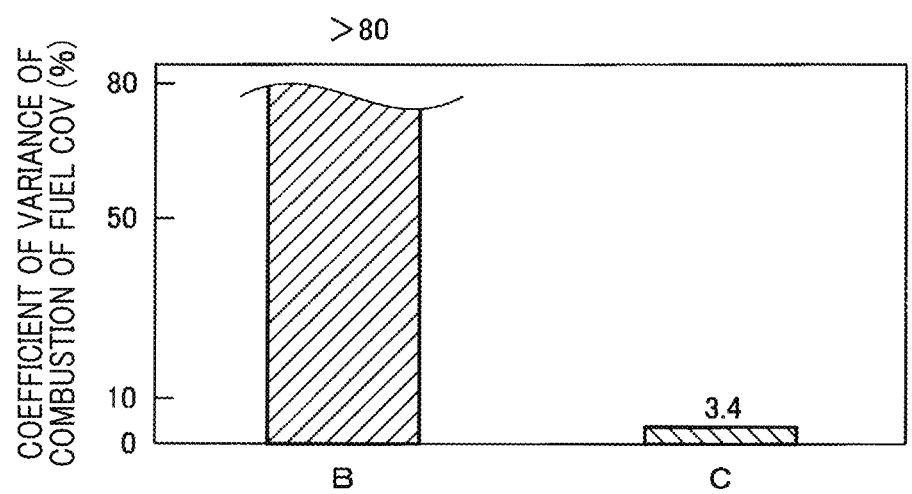
FIG. 14 is a diagrammatic view which shows results of measurements of coefficients of variance of combustion of fuel in the third experimental example.

This example is, as illustrated in FIG. 14, to analyze the stability of combustion of fuel in the internal combustion engine 1 in the first embodiment and the internal combustion engine 9 in the first comparative mode. Such stability was evaluated by measuring a coefficient of variance (COV) of the combustion of fuel. Conditions of experiments are the same as in the second experimental example.

The COV of the combustion of fuel is given by the following equation.

COV (%)=(Indicated mean effective pressure (i.e., the standard deviation))/(Indicated mean effective pressure (i.e., the mean)

FIG. 14 represents results of the experiments. In FIG. 14, "B" indicates the first comparative mode. "C" indicates the first embodiment. The graph in FIG. 14 shows that the COV in the internal combustion engine 9 in the first comparative mode is 80% or more, while the COV in the internal combustion engine 1 in the first embodiment 3.4%. This means that the first embodiment is capable of greatly improving the stability of combustion of fuel.

Second Embodiment

Figure 15:
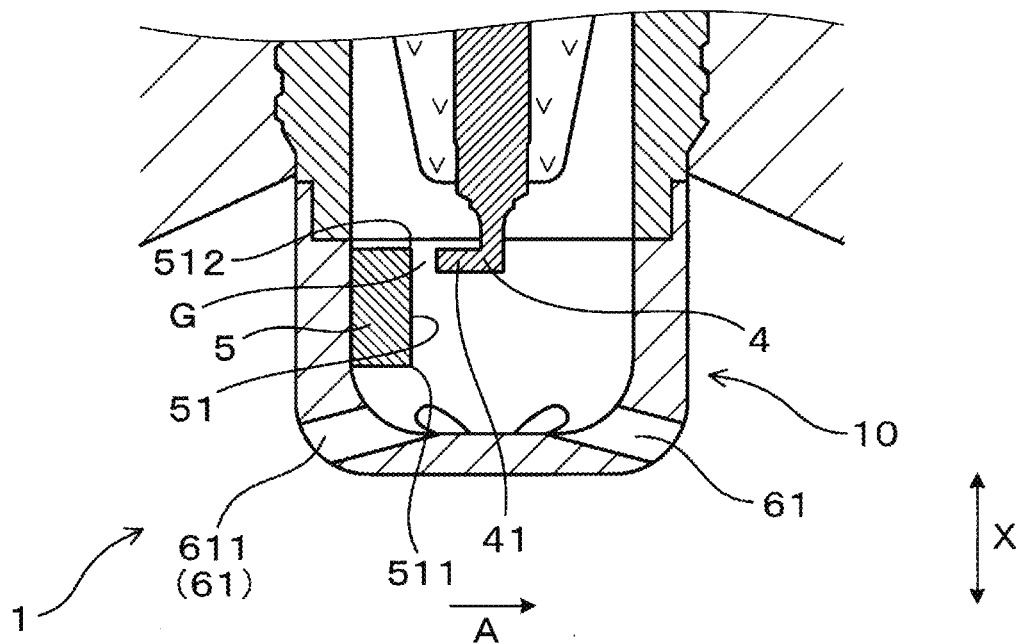
FIG. 15 is an explanatory sectional view of a top end portion of a spark plug in the second embodiment.
Figure 16:
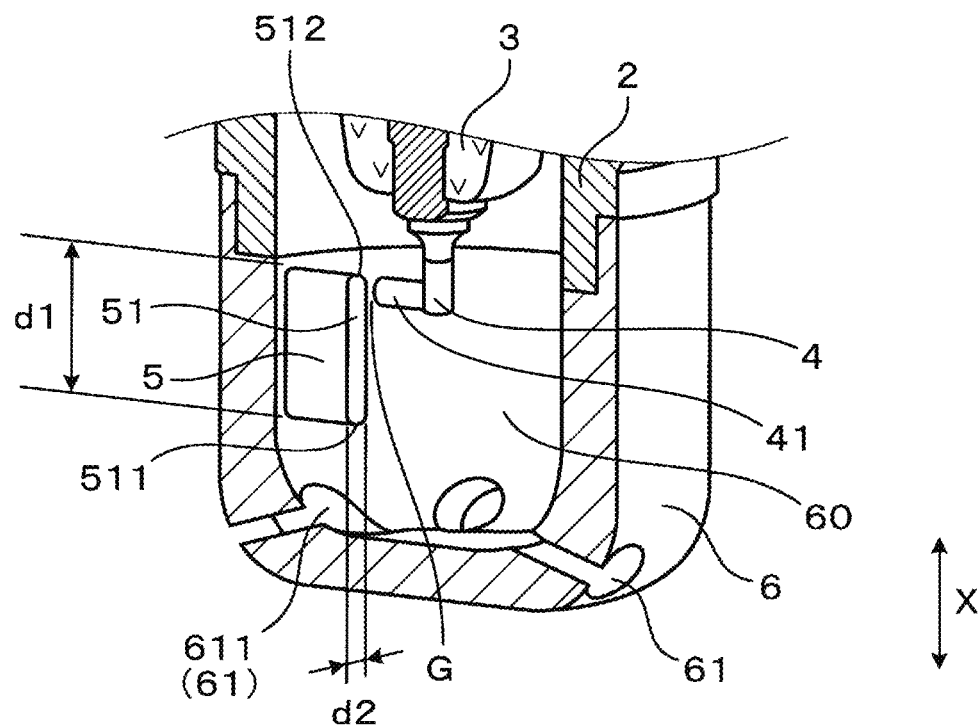
FIG. 16 is a partially sectional view of a top end portion of a spark plug in the second embodiment.

This embodiment is a mode in which the ground electrode 5 is, as illustrated in FIGS. 15 and 16, elongated in the plug axial direction X. Specifically, the ground electrode 5 protrudes from the inner surface of the prechamber-defining portion 6 into the prechamber 60 and is shaped to have an increased length in the plug axial direction X. In other words, the ground electrode 5 is shaped to have a width in the plug circumferential direction and a length in the plug axial direction X which is larger than the width. More specifically, the ground electrode 5 has dimensions d1 and d2 which are selected to meet a relation of d1>d2. The ground electrode 5 has the discharge surface 51 which faces the spark gap G. The discharge surface 51 has the top end portion 511 which is located close to or face the top end of the spark plug 10. The top end portion 511 is located closer to the top end of the spark plug 10 than the center electrode 4 is. The plug circumferential direction, as referred to herein, is a direction in which a line tangent to a circle defined around the plug center axis C (i.e., the center) extends.

The discharge surface 51 of the ground electrode 5 has the base end portion 512 which is located at substantially the same position as the top end (i.e., the tip) of the center electrode 4 in the plug axial direction X. Other arrangements are identical with those in the first embodiment. In the second and following embodiments, the same reference numbers as employed in the first embodiment refer to the same parts unless otherwise specified.

In this embodiment, an initial electrical spark in the spark gap G is likely to be generated between the base end portion 512 of the discharge surface 51 of the ground electrode 5 and the center electrode 4. Afterwards, the end of a length of the spark S on the ground electrode 5 is shifted toward the top end side by a gas flow within the prechamber 60 and then moves on the top end portion 511 of the discharge surface 51 of the ground electrode 5. This results in an increased distance between the ends of the length of the spark S, thereby improving the ignitability of fuel in the prechamber 60. This embodiment additionally offers the same other beneficial advantages as those in the first embodiment.

Third Embodiment

Figure 17:
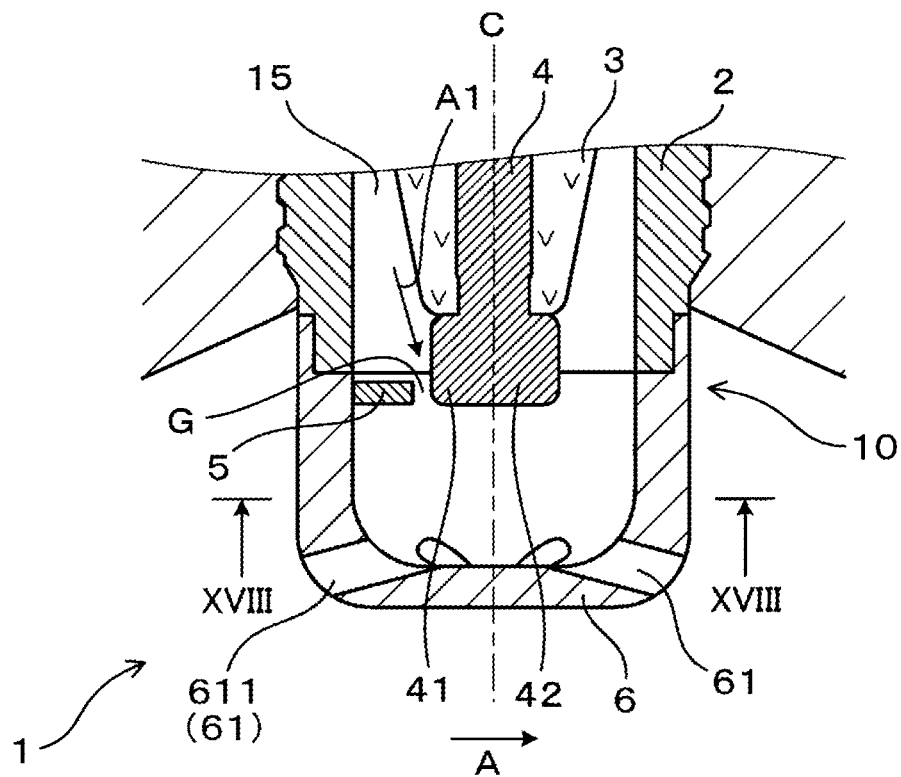
FIG. 17 is an explanatory sectional view of a top end portion of a spark plug in the third embodiment.
Figure 18:
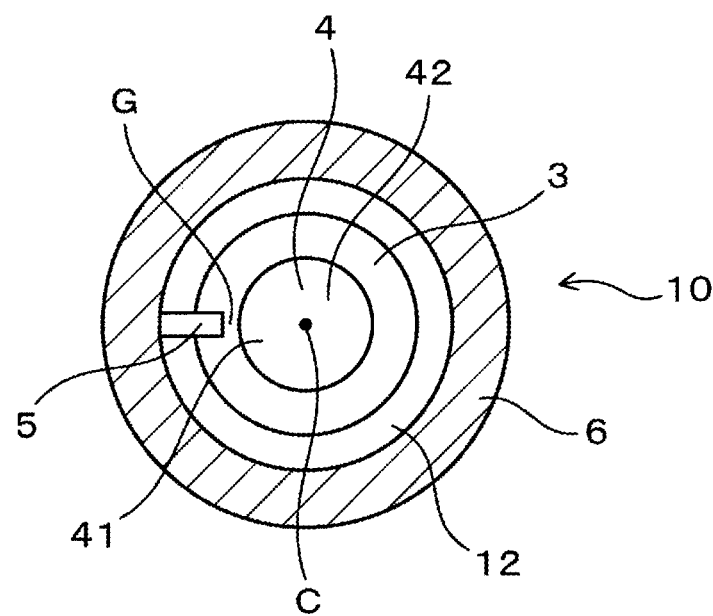
FIG. 18 is a sectional view taken along the line XVIII-XVIII in FIG. 17.

This embodiment is, as illustrated in FIGS. 17 and 18, a mode in which the top end portion of the center electrode 4 has the large-diameter portion 42. In other words, an entire circumference of the top end portion of the center electrode 4 is shaped to radially protrude. This causes the spark gap G to be located farther away from the plug center axis C. The gas flow A1 emerging from the pocket 15 passes through the spark gap G toward the top end side of the spark plug 10.

The cylindrical large-diameter portion 42 of the top end portion of the center electrode 4 facilitates regulation of the location of the spark gap G, thereby improving the productivity of the spark plug 10. This embodiment also offers substantially the same other beneficial advantages as those in the first embodiment.

Fourth Embodiment

Figure 19:
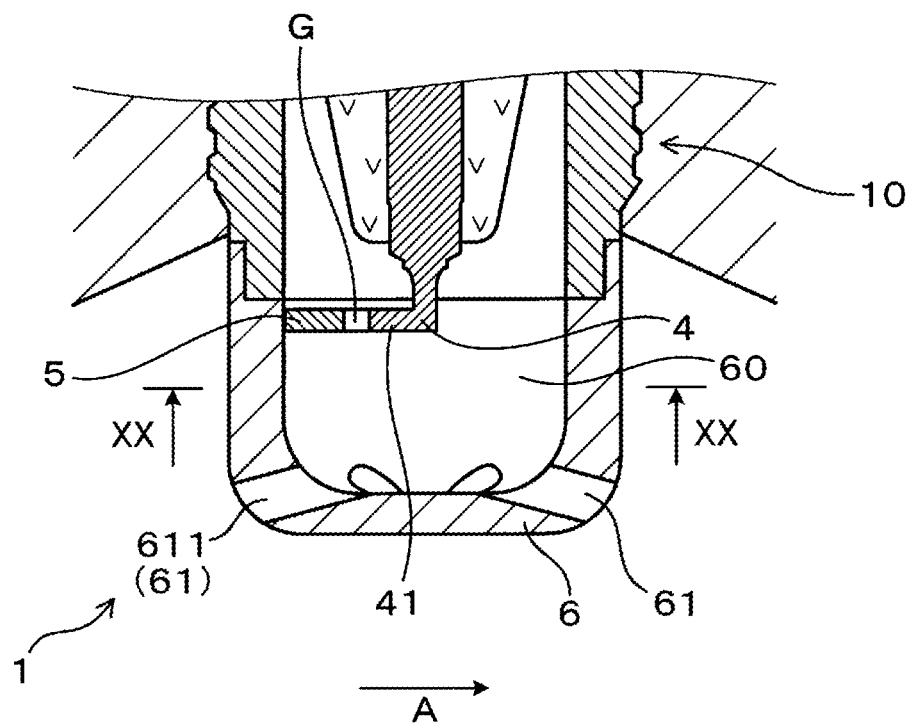
FIG. 19 is an explanatory sectional view of a top end portion of a spark plug in the fourth embodiment.
Figure 20:
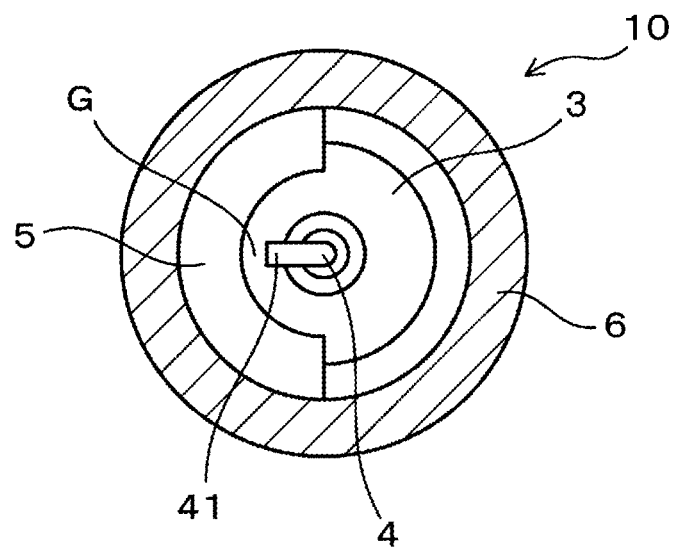
FIG. 20 is a sectional view taken along the line XX-XX in FIG. 19.

This embodiment is, as illustrated in FIGS. 19 and 20, is a mode in which the ground electrode 5 is shaped to be of a semi-annular shape which occupies a half of a circumference of the spark plug 10 and extends around the plug center axis C. In other words, the ground electrode 5 protrudes from the inner circumferential surface of the prechamber-defining portion 6 and occupies an angular range of 180° along the inner circumferential surface of the prechamber-defining portion 6 on an upstream side in the gas flow A in the main combustion chamber 11. Other arrangements are identical with those in the first embodiment.

This embodiment enables the spark gap G to be formed over an increased range on the upstream side in the main chamber gas flow A. An angular range occupied by the ground electrode 5, as viewed in the plug axial direction X in FIG. 20, is 180°, but however, may be selected to be less than 180°.

Fifth Embodiment

Figure 21:
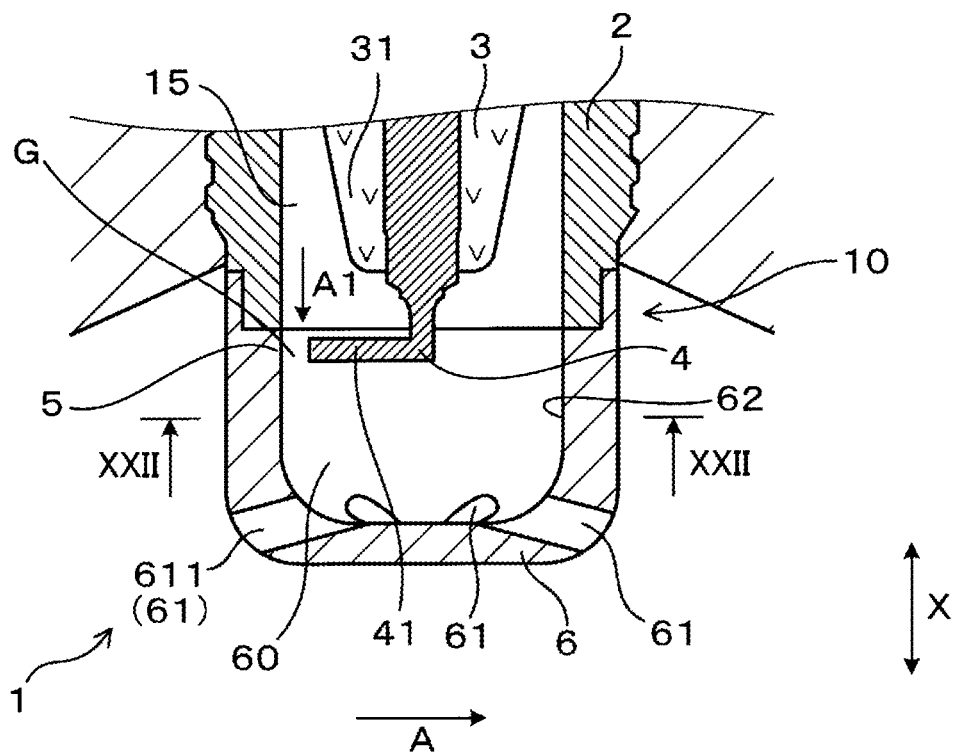
FIG. 21 is an explanatory sectional view of a top end portion of a spark plug in the fifth embodiment.
Figure 22:
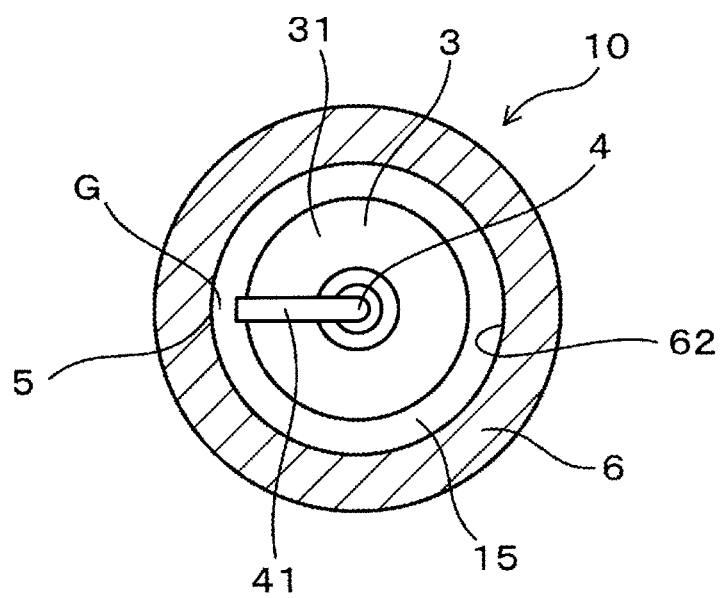
FIG. 22 is a sectional view taken along the line XXII-XXII in FIG. 21.

This embodiment is, as illustrated in FIGS. 21 and 22, a mode in which the ground electrode 5 is defined by the inner wall surface 62 of the prechamber 60. Specifically, the ground electrode 5 is shaped not to protrude from the inner wall surface 62 of the prechamber 60.

The electrode protrusion 41 of the center electrode 4 is elongated to near the inner wall surface 62 of the electrode protrusion 41 to create the spark gap G between itself and the inner wall surface 62. In other words, a protruding end or tip of the electrode protrusion 41 faces the inner wall surface 62 of the prechamber 60 through the spark gap G. To say this in a different way, a portion of the inner surface of the prechamber 60 which faces the tip of the electrode protrusion 41 forms the ground electrode 5.

In this embodiment, a portion of the prechamber-defining portion 6 is, as described above, shaped to face the electrode protrusion 41 to form the ground electrode 5. Other arrangements are identical with those in the first embodiment.

This embodiment facilitates orientation of the gas flows A1, as moving along the inner wall surface 62 of the prechamber 60 (i.e., the inner surfaces of the housing 2 and the prechamber-defining portion 6) toward the top end side and passing through the spark gap G, in substantially the same direction. This enhances the extension of a spark developed in the spark gap G and facilitates movement of an end of length of the spark S on the inner wall surface 62 in the axial direction of the spark plug 10, thereby resulting in an increased distance between the ends of length of the spark S. This increases an overall extended length of the spark S. This embodiment also offers substantially the same other beneficial advantages as those in the first embodiment.

The tip of the electrode protrusion 41 may be designed to face the inner surface of the housing 2. In this case, a portion of the housing 2 functions as the ground electrode 5.

Sixth Embodiment

Figure 23:
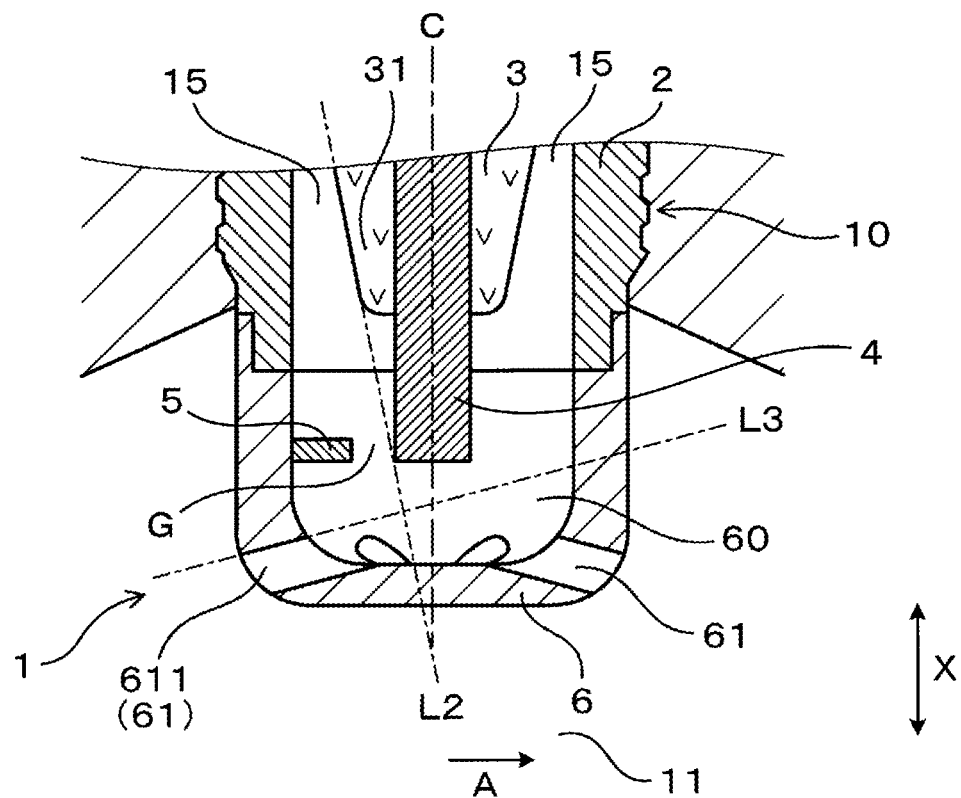
FIG. 23 is an explanatory sectional view of a top end portion of a spark plug in the sixth embodiment.
Figure 24:
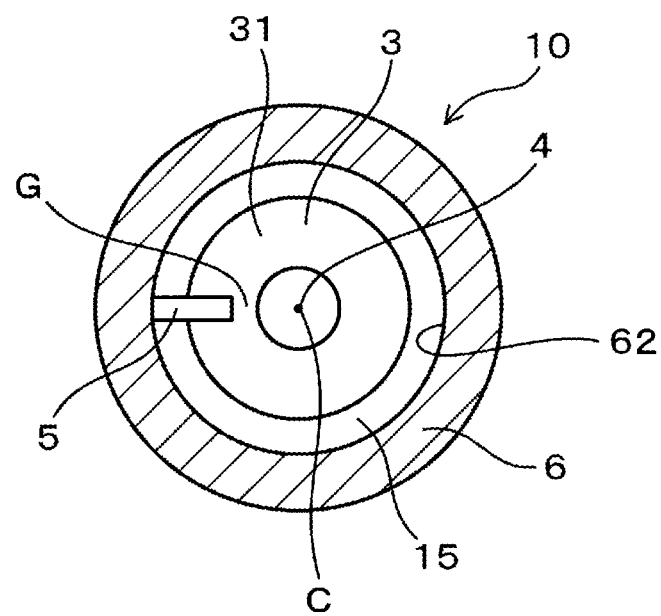
FIG. 24 is a sectional view taken along the line XXIV-XXIV in FIG. 23.

This embodiment is, as illustrated in FIGS. 23 and 24, a mode in which the center electrode 4 is designed not to have the electrode protrusion 41 (see FIG. 2). The ground electrode 5 which protrudes from the inner wall surface 62 of the prechamber 60 has the tip facing the side surface of the center electrode 4 to define the spark gap G between the side surface of the center electrode 4 and the ground electrode 5.

The ground electrode 5 is arranged upstream of the center electrode 4 in the main chamber gas flow A and faces the side surface of the center electrode 4. The spark gap G is, therefore, located upstream of the plug center axis C in the main chamber gas flow A. The center electrode 4, as clearly illustrated in FIG. 23, protrudes to have a tip which is located closer to the top end of the spark plug 10 than that in the first embodiment (see FIG. 2) is. Specifically, the tip of the center electrode 4 is arranged near the center of the prechamber 60 in the direction X, thereby locating the spark gap G upstream of the extension L2 extending from the outer peripheral surface of the tapered head 31 in the main chamber gas flow A, as viewed in a planar cross section of the spark plug 10 (i.e., the cross section in FIG. 23) defined to include the plug center axis C and passing through the spark gap G.

The spark gap G is located closer to the base end of the spark plug 10 than the extension L3 from the base end side surface of the upstream spray hole 611 is. Other arrangements are identical with those in the first embodiment.

This embodiment eliminates the need for the center electrode 4 to have the electrode protrusion 41, thereby resulting in a simplified structure of the spark plug 10. This provides the spark plug 10 and the internal combustion engine 1 which are excellent in productivity. Other arrangements are identical with those in the first embodiment.

In each of the above embodiments, the prechamber-defining portion 6 is made of a member discrete from the housing 2, but however, the prechamber-defining portion 6 and the housing 2 may be made of a single or one-piece member.

This disclosure is not limited to the above described embodiments and their modifications and may be realized in various ways without departing from the principle of the disclosure.

While this disclosure has referred to the preferred embodiments, it should be appreciated that the embodiments in this disclosure are not limited to the structures as described above and can be modified in various ways without departing from the principle of this disclosure. Therefore, this disclosure should be understood to include all possible embodiments and modifications to the shown embodiments which can be embodied without departing from the principle of this disclosure.

What is claimed is:

1. An internal combustion engine equipped with a spark plug wherein, the spark plug includes;

a cylindrical housing;

a porcelain insulator which is retained in the housing;

a center electrode which is retained in the porcelain insulator and protrudes from a top end of the porcelain insulator;

a ground electrode which is located outside the center electrode and faces an outer periphery of the center electrode to define a spark gap between itself and the center electrode; and a prechamber-defining portion which is disposed on a top end of the housing, wherein the prechamber-defining portion has formed therein a prechamber in which the spark gap is arranged, the prechamber-defining portion has a plurality of spray holes which communicate between the prechamber and a main combustion chamber of the internal combustion engine, at least one of the spray holes is an upstream spray hole which is arranged upstream of a plug center axis in a gas flow within the main combustion chamber and designed such that and an angle which an extension of the upstream spray hole in an opening direction thereof makes with an inner wall surface of the prechamber is selected to be larger than 90° on a base end side of the extension in the opening direction, the spark gap is arranged upstream of the plug center axis in the gas flow within the main combustion chamber, the porcelain insulator has a tapered head which has a diameter decreasing toward a tip thereof, and in a planar cross section of the spark plug defined to include the plug center axis and passes through the spark gap, the spark gap is located upstream of an extension extending from an outer peripheral surface of the tapered head in the gas flow within the main combustion chamber, and the center electrode has an electrode protrusion which protrudes radially outwardly, a protruding end of the electrode protrusion faces the inner wall surface of the prechamber through the spark gap, and a portion of an inner surface of the prechamber which faces the protruding end of the electrode protrusion is configured as the ground electrode.

2. A spark plug for an internal combustion engine comprising:

a cylindrical housing;

a porcelain insulator which is retained in the housing;

a center electrode which is retained in the porcelain insulator and protrudes from a top end of the porcelain insulator;

a ground electrode which is located outside the center electrode and faces an outer periphery of the center electrode to define a spark gap between itself and the center electrode; and a prechamber-defining portion which is disposed on a top end of the housing, wherein the prechamber-defining portion has formed therein a prechamber in which the spark gap is arranged, the prechamber-defining portion has a plurality of spray holes which communicate between the prechamber and an outside of the prechamber-defining portion, the center electrode has an electrode protrusion which protrudes outwardly radially and defines the spark gap between itself and the ground electrode which is arranged to face a protruding end of the electrode protrusion, at least one of the spray holes is a gap-side spray hole which is arranged on the same side of a plug center axis as the spark gap, the gap-side spray hole is designed such that an angle which an extension of the gasp-side spray hole in an opening direction thereof makes with an inner wall surface of the prechamber is selected to be larger than 90° on a base end side of the extension in the opening direction, the porcelain insulator has a tapered head which has a diameter decreasing toward a tip thereof, and in a planar cross section of the spark plug defined to include the plug center axis and passes through the spark gap, the spark gap is located farther away from a plug center axis than an extension extending from an outer peripheral surface of the tapered head is, and a protruding end of the electrode protrusion faces the inner wall surface of the prechamber through the spark gap, and a portion of an inner surface of the prechamber which faces the protruding end of the electrode protrusion is configured as the ground electrode.

3. The internal combustion engine as set forth in claim 1, wherein the spark gap is located closer to a base end side than an extension of a base end side surface of the upstream spray hole is.

4. The spark plug as set forth in claim 2, wherein the spark gap is located closer to a base end side than an extension of a base end side surface of the gap-side spray hole is.

* * * * *